US012719979B2

(12) United States Patent
Agrawal et al.

(10) Patent No.: US 12,719,979 B2
(45) Date of Patent: Aug. 25, 2026

(54) CONTEXTUAL DO-NOT-DISTURB MODE FOR ELECTRONIC DEVICES

(71) Applicant: MOTOROLA MOBILITY LLC, Wilmington, DE (US)

(72) Inventors: Amit Kumar Agrawal, Bangalore (IN); Krishnan Raghavan, Bangalore (IN); Hariprasad Shanbhogue Alampady, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 397 days.

(21) Appl. No.: 18/476,783

(22) Filed: Sep. 28, 2023

(65) Prior Publication Data

US 2025/0112987 A1 Apr. 3, 2025

(51) Int. Cl.
*H04M 1/72454* (2021.01)
*H04M 1/72457* (2021.01)

(52) U.S. Cl.
CPC ... *H04M 1/72454* (2021.01); *H04M 1/72457* (2021.01)

(58) Field of Classification Search
CPC ......... H04M 1/72457; H04M 1/72454; H04M 1/72463
See application file for complete search history.

(56) References Cited

U.S. PATENT DOCUMENTS

| | | | | |
|---|---|---|---|---|
| 8,385,884 | B1 * | 2/2013 | Hertzfeld | H04M 3/42382 455/565 |
| 2007/0019670 | A1 * | 1/2007 | Falardeau | H04W 48/18 370/465 |
| 2014/0282003 | A1 * | 9/2014 | Gruber | G06F 3/167 715/727 |
| 2015/0350146 | A1 * | 12/2015 | Cary | H04L 51/046 709/206 |
| 2016/0373905 | A1 * | 12/2016 | Warr | H04W 4/16 |
| 2018/0287986 | A1 * | 10/2018 | Yoon | H04L 67/55 |
| 2019/0014209 | A1 * | 1/2019 | Hamme | H04M 3/42365 |
| 2024/0077929 | A1 * | 3/2024 | Alverson | G06F 1/3265 |

* cited by examiner

*Primary Examiner* — Farid Seyedvosoghi
(74) *Attorney, Agent, or Firm* — Isidore PLLC

(57) ABSTRACT

A method provides techniques for detecting, by a processor of an electronic device, a use context associated with a do-not-disturb (DnD) operating mode of the electronic device. In response to detecting the DnD use context, a notification mode of the electronic device is changed from an original setting to a restrictive setting in which received and/or automatically generated notifications are not outputted in certain scenarios or during execution of certain applications or processes. The method further includes detecting entry into a DnD inactive condition from among a completion of the DnD use context or a switch to another use context that does not require a DnD operating mode, and restoring the notification mode of the electronic device to the original setting, based on detecting the DnD inactive condition.

20 Claims, 9 Drawing Sheets

300
Quick Sale on headphones! 40% off if purchased in the next 3 minutes!
308
Tap icon to purchase
304

CONTEXTUAL DO-NOT-DISTURB MODE FOR ELECTRONIC DEVICES

BACKGROUND

1. Technical Field

The present disclosure generally relates to portable electronic communication devices, and more specifically to handling of notifications for portable electronic communication devices.

2. Description of the Related Art

Smartphones have become an integral part of daily life, and they provide a wide range of functionality. This functionality can include communication via voice calls, text messages, and/or other messaging applications (apps). Another important function of smartphones includes using multimedia applications. This use can include capturing photos and videos using onboard cameras, as well as listening to music and watching videos and movies. Other popular functions of smartphones include gaming, navigation, ecommerce, online banking, health and fitness tracking, and more. These are just a few examples, as smartphones offer a vast array of applications and functionalities that cater to various interests and needs.

Smartphones can provide notifications regarding various events, such as incoming messages, calls, emails, and social media updates. Smartphones enable real-time communication and help users stay connected with each other. Smartphone notifications can provide information updates for applications such as news, weather, sports scores, stock market changes, and other important information. Additionally, these notifications can serve as reminders for important tasks, appointments, and events, including reminding users of upcoming meetings, birthdays, or deadlines, to ensure that users do not forget or miss anything important. Many applications (apps) send notifications to provide updates or inform a user about specific events. For example, a ride-sharing app might send notifications when a user's ride arrives, a food delivery app might notify a user about the status of his/her order, or a fitness app might remind a user to complete a daily exercise goal.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
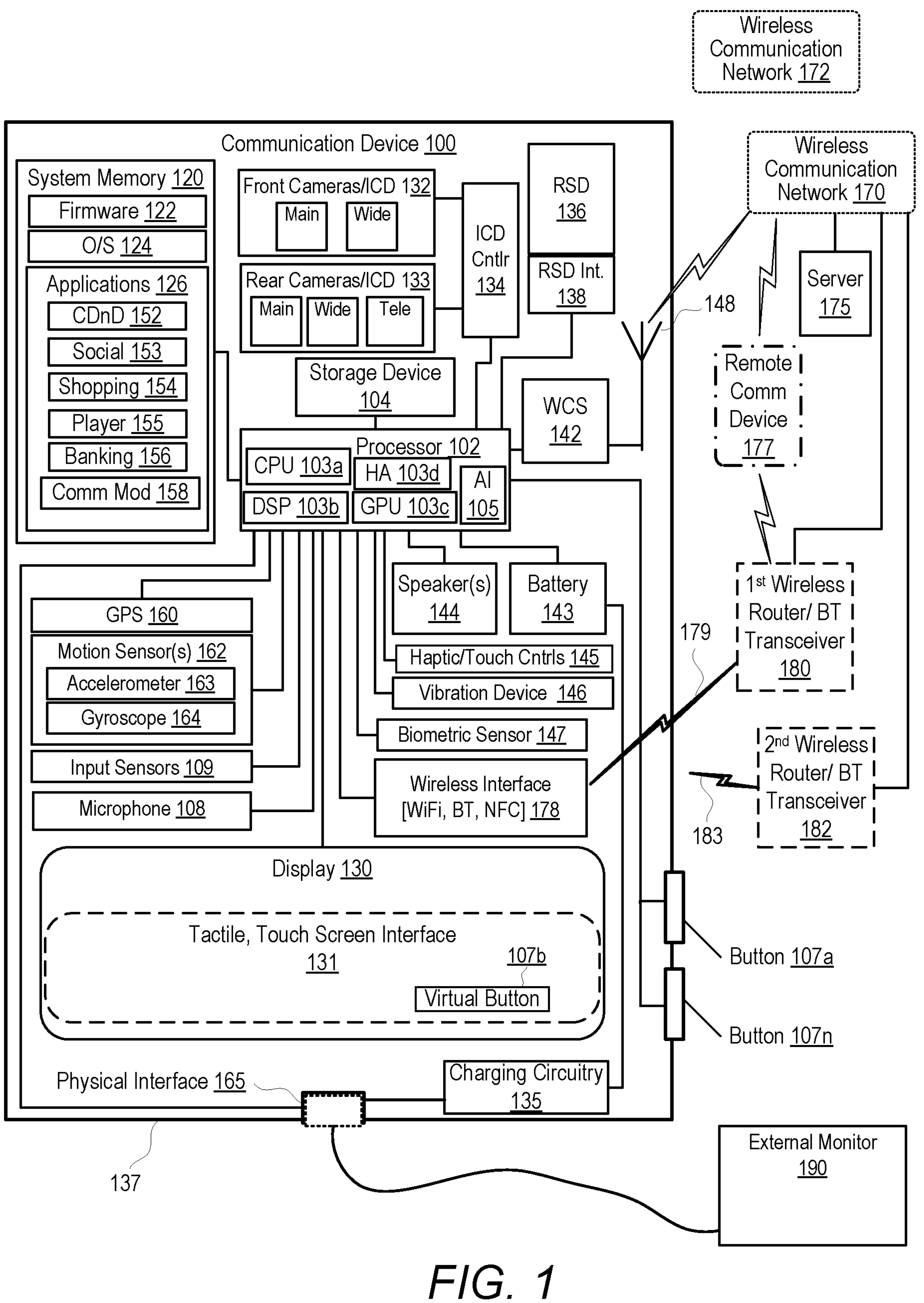
FIG. 1 depicts an example component makeup of an electronic communication device that can be configured to operate in a contextual do-not-disturb (DnD) mode, and within which various aspects of the disclosure can be implemented, according to one or more embodiments.

According to aspects of the disclosure, an electronic (communication) device, a method, and a computer program product provide a contextual do-not-disturb (DnD) operating mode for the electronic device. The processor of the electronic device detects a 'use context' that is a context associated with a do-not-disturb (DnD) operating mode of the electronic device. In response to detecting the DnD use context, the processor changes a notification mode of the electronic device from an original setting to a restrictive setting. In one or more embodiments, the original setting is a default setting regarding how notifications for incoming messages, incoming voice calls, and/or other alerts are surfaced/presented on an electronic device. The restrictive setting is a notification setting that suppresses more incoming notifications than the original setting. As an example, the original setting may surface (present on screen) text messages, and also generate an audible sound indicating arrival of the message, while the restrictive setting may result in no audible sound for the arrival of the message, and no presenting of the text message on the screen at the time that the text message is received.

After being in the DnD active condition for a period of time, the processor may detect entry into a DnD inactive condition from among a completion of the DnD use context or a switch to another use context that does not require a DnD operating mode. The processor then restores the notification mode of the electronic device to the original setting, based on detecting the DnD inactive condition. Throughout this disclosure, the terms 'electronic device,' 'communication device,' and 'electronic communication device' may be used interchangeably, and may refer to devices such as smartphones, tablet computers, and/or other computing/communication devices.

An increasingly large number of users use their mobile devices (e.g., smartphones, tablets, and the like) for financial operations such as ecommerce, banking, trading stocks and other securities, and so on. While performing such operations, an unsolicited alert from an incoming message or call can cause a distraction to a user that is in the process of an important transaction. Mistakes made during financial operations such as ecommerce, banking, trading stocks and other securities can have serious financial consequences. Disclosed embodiments enable a contextual do-not-disturb (DnD) operating mode based on a use context. The use context can be based on execution of an application (app) on the electronic device. The use context can be based on a particular subfunction of an application (e.g., in a particular menu/user interface of an app). The use context can be based on a geographic location (e.g., a user being located at his/her office). Other use contexts can also be supported. Embodiments enable a use context to trigger the device entering into or implementing a restrictive notification mode. As an example, while using a banking app, disclosed embodiments automatically enter a restrictive notification mode. While in the restrictive notification mode, audio, visual, and haptic indications of incoming notifications, including text messages, multimedia messages, and/or incoming voice calls, may be suspended. Data pertaining to the notifications may be stored in a message log. Incoming voice calls may be automatically directed to voicemail. This enables the user to perform banking operations without unexpected distractions due to incoming messages. When the user closes the banking app, or puts the banking app in background operation (e.g., by bringing another app to the foreground), the use context can automatically change to a use context that enables the original notification mode, allowing notifications and/or incoming calls to be processed normally.

In one or more embodiments, an application may execute an API (application programming interface) call to indicate to an operating system on the electronic device that the electronic device is in a DnD context, and in response, the operating system sets the notification mode to the restrictive mode. Similarly, once the critical operations are complete (e.g., completing a bank transfer), the application may execute an API (application programming interface) call to indicate to an operating system on the electronic device that the electronic device is in a normal use context, and in response, the operating system sets the notification mode to the original mode (allowing notifications to be surfaced). In some embodiments, the operating system determines the use context based on the foreground application. In one or more embodiments, applications can be designated as critical applications. These applications can include banking applications, ecommerce applications, and so on. Additionally, certain websites and/or URLs can be designated as critical, such that when a browser is on one of the specified websites, the device enters a restrictive notification mode. Other embodiments may utilize combinations of the aforementioned techniques, and/or other techniques, in order to detect a use context.

According to aspects of disclosed embodiments, the electronic communication device includes at least one display that renders content from applications, including, but not limited to, banking applications, ecommerce (shopping) applications, media player applications, gaming applications, and/or other applications and also renders notifications and messages, etc. The communication device also includes a memory having stored thereon a contextual do-not-disturb (CDnD) application with program code for transitioning the electronic device between an original (normal) notification mode and a restricted notification mode, based on a use context. The use context can include a particular application, such as a banking application, executing in the foreground. In some embodiments, a particular subset of user interfaces within an application can comprise a use context associated with a restricted notification mode. As an example, an ecommerce application can establish a first use context associated with an original notification mode while a user is browsing for products. Then, when the user enters a 'shopping cart' user interface or otherwise begins a 'checkout' process, the ecommerce application can establish a second use context, where the second use context is associated with a restricted notification mode. During operation of the electronic device while in the restricted notification mode, the audio, visual, and/or haptic alerts of incoming notifications, including, but not limited to, text messages, email messages, incoming voice calls, and/or incoming application messages, can be suspended. In this way, the issue of incoming notifications disrupting sensitive operations such as banking and/or ecommerce, is mitigated.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the communication/electronic devices are also described as features and functions provided by a plurality of corresponding methods and computer program products, within the various different embodiments presented herein. In the embodiments presented as computer program products, the computer program product includes a non-transitory computer readable storage device having program instructions or code stored thereon, which enables the communication device and/or host electronic device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms “a”, “an”, and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within communication device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example component makeup of communication device 100, with specific components used to enable the device to operate in a restricted notification mode based on a detected use context, and within which various aspects of the disclosure can be implemented, according to one or more embodiments. Examples of communication device 100 include, but are not limited to, mobile devices, a notebook computer, a mobile phone, a smart phone, a digital camera with enhanced processing capabilities, a smart watch, a tablet computer, and other types of communication device that includes or can be directly connected to an image capturing device (ICD) (or camera) that captures video. It is appreciated that communication device 100 can be other types of communication devices that allow automatically changing to and from a restrictive notification mode based on a detected use context.

Communication device 100 includes processor 102 (typically as a part of a processor integrated circuit (IC) chip), which includes processor resources such as central processing unit (CPU) 103*a*, communication signal processing resources such as digital signal processor (DSP) 103*b*, graphics processing unit (GPU) 103*c*, and hardware acceleration (HA) unit 103*d*. In some embodiments, the hardware acceleration (HA) unit 103*d* may establish direct memory access (DMA) sessions to route network traffic to various elements within communication device 100 without direct involvement from processor 102 and/or operating system 124.

Processor 102 can, in some embodiments, include high quality camera image signal processors (ISPs) (not shown) and dedicated artificial intelligence (AI) engines 105. Collectively, processor 102 supports computing, classifying, processing, transmitting and receiving of data and information, and presenting of graphical images within a display. Processor 102 is communicatively coupled to storage device 104, system memory 120, input devices (introduced below), output devices, including integrated display 130, and image capture device (ICD) controller 134. According to one or more embodiments, ICD controller 134 performs or supports functions such as, but not limited to, selecting and activating an active camera from among multiple cameras and adjusting the camera settings and characteristics (e.g., shutter speed, f/stop, ISO exposure, zoom control, field of view (FOV) angle, etc.) of the active camera. ICD controller 134 can perform these functions in response to commands received from processor 102 in order to control ICDs 132, 133 to capture video or still images of a local scene within a FOV of the operating/active ICD.

In one or more embodiments, the functionality of ICD controller 134 is incorporated within processor 102, eliminating the need for a separate ICD controller. Thus, for simplicity in describing the features presented herein, the various camera selection, activation, and configuration functions performed by the ICD controller 134 are described as being provided generally by processor 102. Similarly, manipulation of captured images and videos are typically performed by GPU 103*c* and certain aspects of device communication via wireless networks are performed by DSP 103*b*, with support from CPU 103*a*. However, for simplicity in describing the features of the disclosure, the functionality provided by one or more of CPU 103*a*, DSP 103*b*, GPU 103*c*, and ICD controller 134 are collectively described as being performed by processor 102. Processor 102 can also be generally referred to as controller 102.

Throughout the disclosure, the term image capturing device (ICD) is utilized interchangeably to be synonymous with and/or refer to any one of front or rear facing cameras 132, 133. Front facing cameras 132 and rear facing cameras 133 are communicatively coupled to ICD controller 134, which is communicatively coupled to processor 102. Both sets of cameras 132, 133 include image sensors that can capture images that are within the field of view (FOV) of the respective ICD 132, 133. Communication device 100 can include multiple cameras having different functionality, such as a main camera capturing standard view, wide angle camera that captures a wide angle FOV, and telephoto ICD, which captures a telephoto FOV (zoom or magnified). In one or more embodiments, a single camera can be provided with camera control options to change the single camera lens to allow for wide angle and telephoto image capture. In embodiments, one or more of the ICDs may be used for performing user identification via facial recognition.

System memory 120 may be a combination of volatile and non-volatile memory, such as random-access memory (RAM) and read-only memory (ROM). System memory 120 can store program code or similar data associated with firmware 122, an operating system 124, and/or applications 126. During device operation, processor 102 processes program code of the various applications, modules, OS, and firmware, that are stored in system memory 120.

In accordance with one or more embodiments, applications 126 include, without limitation, contextual do-not disturb (CDnD) application 152, social media application 153, shopping application 154, media player application 155, banking application 156, and communication module 158. Each module and/or application provides program instructions/code that are processed by processor 102 to cause processor 102 and/or other components of communication device 100 to perform specific operations, as described herein. Descriptive names assigned to these modules add no functionality and are provided solely to identify the underlying features performed by processing of the different modules. For example, CDnD application 152 includes program instructions that support communication device 100 being configured to transition between an original notification mode and a restrictive notification mode, based on a use context. Thus, in embodiments, CDnD 152 can serve to suspend audio, visual, and/or haptic notification of voice calls and/or notifications on electronic communication device 100, based on a detected use context.

In one or more embodiments, communication device 100 includes removable storage device (RSD) 136, which is inserted into RSD interface 138 that is communicatively coupled via system interlink to processor 102. In one or more embodiments, RSD 136 is a non-transitory computer program product or computer readable storage device. RSD 136 may have a version of one or more of the applications (e.g., 152, 153, 154, 155, 156) stored thereon. Processor 102 can access RSD 136 to provision communication device 100 with program code that, when executed/processed by processor 102, the program code causes or configures processor 102 and/or generally communication device 100, to provide the various contextual DnD functions described herein.

Communication device 100 includes an integrated display 130 which incorporates a tactile, touch screen interface 131 that can receive user tactile/touch input. As a touch screen device, integrated display 130 allows a user to provide input to or to control communication device 100 by touching features within the user interface presented on display screen. Tactile, touch screen interface 131 can be utilized as an input device. The touch screen interface 131 can include one or more virtual buttons, indicated generally as 107*b*. In embodiments, when a user applies a finger on the touch screen interface 131 in the region demarked by the virtual button 107*b*, the touch of the region causes the processor 102 to execute code to implement a function associated with the virtual button. In some implementations, integrated display 130 is integrated into a front surface of communication device 100 along with front ICDs, while the higher quality ICDs are located on a rear surface.

Communication device 100 can further include microphone 108, one or more output devices such as speakers 144, and one or more input buttons 107*a*-107*n*. Microphone 108 can also be referred to as an audio input device. In some embodiments, microphone 108 may be used for identifying a user via voiceprint, voice recognition, and/or other suitable techniques. Input buttons 107*a*-107*n* may provide controls for volume, power, and ICDs 132, 133. Additionally, communication device 100 can include input sensors 109 (e.g., enabling gesture detection by a user).

Communication device 100 further includes haptic touch controls 145, vibration device 146, fingerprint/biometric sensor 147, global positioning system (GPS) device 160, and motion sensor(s) 162. Vibration device 146 can cause communication device 100 to vibrate or shake when activated. Vibration device 146 can be activated during an incoming call or message in order to provide an alert or notification to a user of communication device 100. According to one aspect of the disclosure, integrated display 130, speakers 144, and vibration device 146 can generally and collectively be referred to as output devices.

Biometric sensor 147 can be used to read/receive biometric data, such as fingerprints, to identify or authenticate a user, and in some embodiments, the biometric sensor 147 can supplement an ICD (camera) for user detection/identification.

GPS device 160 can provide time data and location data about the physical location of communication device 100 using geospatial input received from GPS satellites. Motion sensor(s) 162 can include one or more accelerometers 163 and gyroscope 164. Motion sensor(s) 162 can detect movement of communication device 100 and provide motion data to processor 102 indicating the spatial orientation and movement of communication device 100. Accelerometers 163 measure linear acceleration of movement of communication device 100 in multiple axes (X, Y and Z). Gyroscope 164 measures rotation or angular rotational velocity of communication device 100. In one or more embodiments, the measurements of these various sensors can also be utilized by processor 102 to determine, based on data received from the geolocation module, that a current location of the electronic device is a pre-established location in which DnD operations are completed by a user of the electronic device. The processor 102 activates the DnD operating mode in response to determining the electronic device is in the pre-established location. Communication device 100 further includes a housing 137 (generally represented by the thick exterior rectangle) that contains/protects the components internal to communication device 100.

Communication device 100 also includes a physical interface 165. Physical interface 165 of communication device 100 can serve as a data port and can be coupled to charging circuitry 135 and device battery 143 to enable recharging of device battery 143. Additionally, in some embodiments, the physical interface 165 may support connection of an external monitor 190 for duplicating and/or extending the display 130. In some embodiments, the external monitor 190 may be connected to the communication device 100 wirelessly instead of via the physical interface 165.

Communication device 100 further includes wireless communication subsystem (WCS) 142, which can represent one or more front end devices (not shown) that are each coupled to one or more antennas 148. In one or more embodiments, WCS 142 can include a communication module with one or more baseband processors or digital signal processors, one or more modems, and a radio frequency (RF) front end having one or more transmitters and one or more receivers. Example communication module 158 within system memory 120 enables communication device 100 to communicate with wireless communication network 170 and with other devices, such as server 175 and remote communication device 177, via one or more of data, audio, text, and video communications. Communication module 158 can support various communication sessions by communication device 100, such as audio communication sessions, video communication sessions, text communication sessions, exchange of data, and/or a combined audio/text/video/data communication session. As shown in FIG. 1, multiple wireless communication networks can be present in a given area, including second wireless communication network 172. However, communication device 100 is connected to wireless communication network 170, but is not connected to second wireless communication network 172. Situations may arise in which communication device 100 switches from connecting via wireless communication network 170 to connecting to second wireless communication network 172. As described below, such switching by the communication device 100 to a second network can be temporarily prevented/delayed from occurring while the communication device is operating in the DnD mode of operation and can maintain a usable connection with the wireless communication network 170.

WCS 142 and antennas 148 allow communication device 100 to communicate wirelessly with wireless communication network 170 via transmissions of communication signals to and from network communication devices, such as base stations or cellular nodes, of wireless communication network 170. Wireless communication network 170 further allows communication device 100 to wirelessly communicate with application/business server 175, such as a bank server, and remote communication device 177, which can be similarly connected to wireless communication network 170. In one or more embodiments, the financial and other transactions that are being performed on communications device 100 can be supported using or completed via/on application/business server 175. In one or more embodiments, remote communication device 177 can include mobile or cellular phone or similar communication device as communication device, a smart television, laptop computer, tablet computer, smart speaker, or other suitable device. In one or more embodiments, remote communication device 177 can be the source of the notifications or messages that are received at communication device 100 for presenting on the display (visually) or via the speakers (audibly) or haptic device (vibratory).

In one or more embodiments, the contextual do-not-disturb mode can communicate the do-not-disturb status to the remote communication device 177. As an example, if a user is in progress with an important ecommerce transaction, the user may not wish to hear any output from a nearby smart speaker during that process. Thus, in addition to suppressing notifications (via audio, video, and/or haptic outputs), disclosed embodiments can also enable the device to communicate to other devices, such as smart televisions, smart speakers, and the like, to inform those devices of the current DnD status of the communication device 100. If the remote communication devices support the contextual DnD notification, those devices can also suppress audio, video, and/or haptic outputs during a critical operation, such as while the device is being used to make/complete a purchase on an ecommerce site. Accordingly, disclosed embodiments serve to reduce distractions and interruptions to a user during critical operations such as banking, ecommerce, entering/changing/setting passwords, and/or other operations. In one or more embodiments, the processor further sends a DnD active condition message to at least one remote device via the communication subsystem. The DnD active condition message provides an indication to one or more remote communication devices that a DnD active condition is in effect, and incoming messages and/or alerts should be suppressed by the remote devices that receive the DnD active condition. Similarly, when a DnD active condition ends (e.g., a user completes a banking transaction), the processor can further send a DnD inactive condition message to one or more remote devices via the communication subsystem, to inform the remote devices that incoming notifications may be processed normally (not suppressed).

Communication device 100 can also communicate, via wireless interface 178 wirelessly with wireless communication network 170 via communication signals 179 transmitted by short range communication device(s) to and from an external WiFi router (or wireless transceiver device) 180, which is communicatively connected to wireless communication network 170. Wireless interface 178 can be a short-range wireless communication component providing Bluetooth, near field communication (NFC), and/or wireless fidelity (Wi-Fi) connections. In one embodiment, communication device 100 can receive Internet or Wi-Fi based calls, text messages, multimedia messages, and other notifications via wireless interface 178. In one or more embodiments, communication device 100 can communicate wirelessly with external wireless transceiver device 180, such as a WiFi router or BT transceiver, via wireless interface 178. In one embodiment, communication device 100 can communicate wirelessly with external wireless transceiver device 180, such as a WiFi router or BT transceiver, via wireless interface 178. In an embodiment, WCS 142 with antenna(s) 148 and wireless interface 178 collectively provide wireless communication interface(s) of communication device 100.

As illustrated, more than one WiFi router can be located within communication range of communication device 100. In the presented example, second WiFi router 182 is within communication range and present WiFi signal 183 that can be stronger than or present a higher bandwidth than WiFi signal 179 of first WiFi router 180. Communication device 180 can be pre-configured to automatically switch to a detected WiFi connection that has a stronger signal and/or higher bandwidth/throughput (e.g., WiFi signal 183) than an existing WiFi connection (e.g., WiFi signal 179). Similarly, communication device 100 can be generally configured to automatically switch to a wireless network (e.g., WCN 172) having a higher quality than the currently connected wireless network (e.g., WCN 170). In one or more embodiments, the network quality can be a metric based on various criteria, including, but not limited to, signal strength, available bandwidth, latency, subscriber cost, encryption level, and/or other factors. In one or more embodiments, the contextual do-not-disturb mode can temporarily override this feature for both the WCN switching and WiFi switching configurations. As an example, if a user is in progress with an important banking transaction, the user may not wish to change WCS or WiFi networks during that process. Thus, in addition to suppressing notifications (via audio, video, and/or haptic outputs), the disclosed embodiments can also prevent the communication device from switching networks (one or both WCN and WiFi) during operations deemed as critical, based on a detected use context. In one or more embodiments, while the electronic device is connected to a first wireless network (either/both WCN or WiFi) and operating in the restrictive setting, the processor: prevents the communication subsystem from disconnecting from the first wireless network in order to connect to a second wireless network having a higher network quality than the first wireless network; and avoids connecting to the second wireless network, until the DnD inactive condition is detected.

Figure 2:
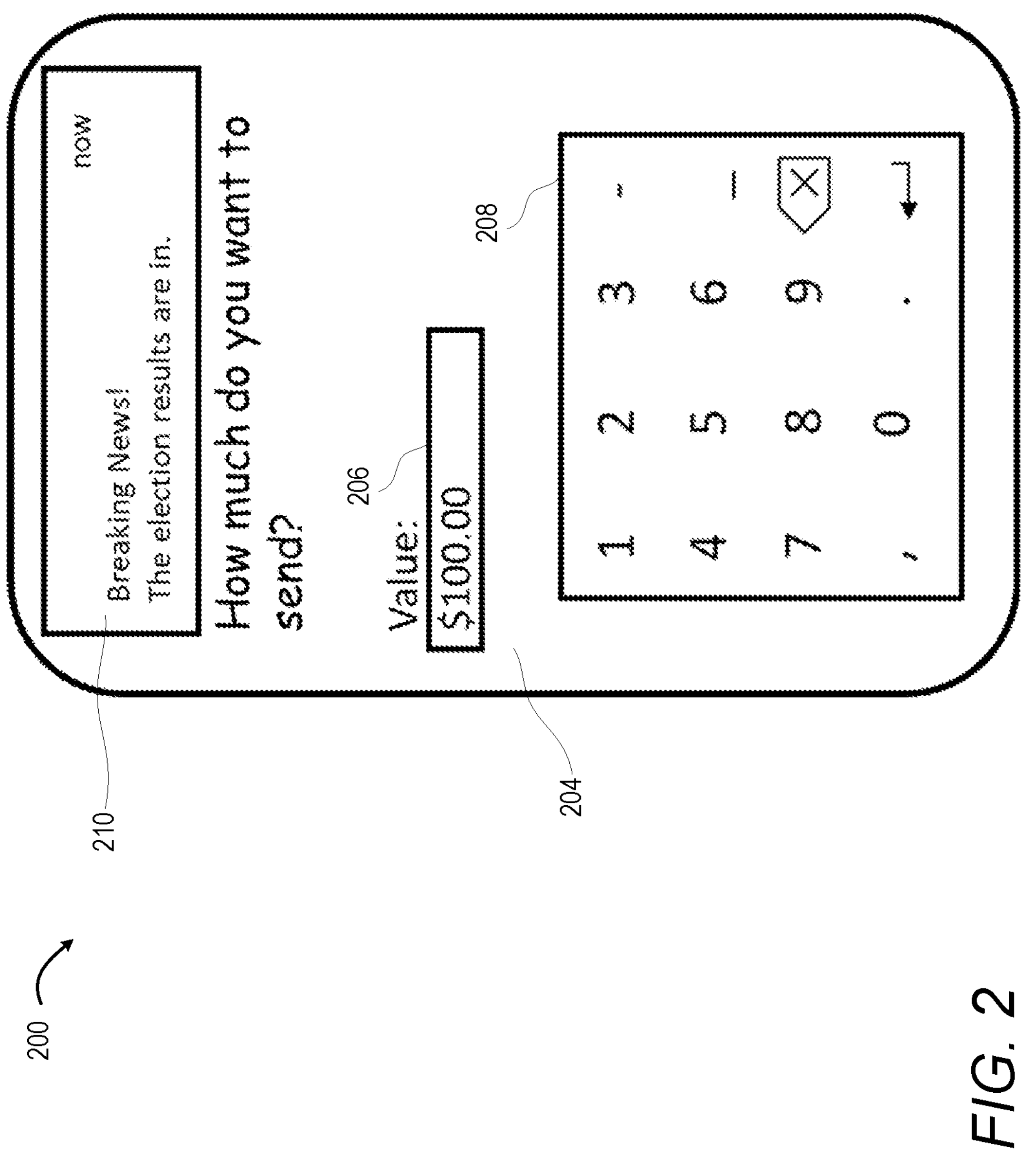
FIG. 2 is a diagram illustrating an example of a notification surfacing during a banking transaction.

FIG. 2 is a diagram illustrating an example of a notification surfacing on a display 130 of example communication device 100 during a banking transaction. Device 200 includes an electronic display 204 that is rendering a banking application executing in the foreground. Device 200 can be an implementation of communication device 100 having similar components and/or functionality. The banking application presents a user interface that includes a transfer amount field 206 and an on-screen keypad 208 to enable numeric entry. While the banking application is executing in the foreground, a notification 210 from a news app appears, potentially distracting the user. While distracted, a user could mistakenly enter the wrong amount for the transfer. Disclosed embodiments prevent the surfacing of notification 210 during operations designated as critical, such as banking applications, and/or other applications configured accordingly, and thus, can prevent the situation depicted in FIG. 2.

Figure 3B:
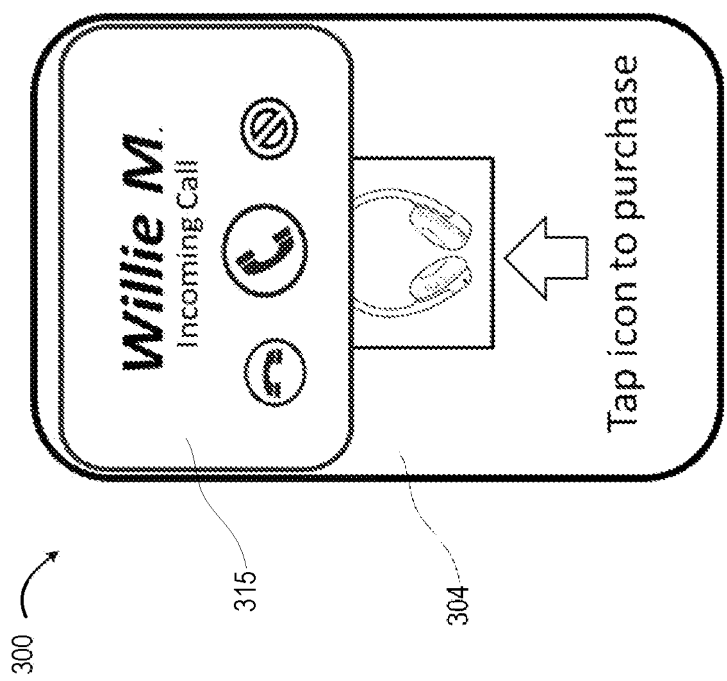
FIG. 3B is a diagram illustrating notification of an incoming voice call presented during the ecommerce transaction depicted in FIG. 3A.
Figure 3A:
FIG. 3A is a diagram illustrating an example of an ecommerce transaction on a display of an electronic device.

FIG. 3A is a diagram illustrating an example of an ecommerce transaction. Device 300 includes an electronic display 304 that is rendering a banking application executing in the foreground. Device 300 can be an implementation of communication device 100 having similar components and/or functionality. Device 300, using display 304 is rendering a flash sale for headphones. A flash sale is a time-bound activity, meaning that the activity must be completed within a predetermined time, which is three minutes in the depicted example. To start the purchase process, the user taps the icon 308. In an example usage scenario, just before starting the purchase process, an incoming call arrives, as depicted in FIG. 3B. As can be seen in FIG. 3B, an incoming call notification 315 has obscured the ecommerce transaction user interface shown in FIG. 3A. This causes delay, distraction, and inconvenience for the user, as the user now has to either decline the call, or quickly answer call and dispatch the caller in order to complete the transaction by the predetermined time. Disclosed embodiments prevent the surfacing of incoming voice calls during operations designated as critical, such as ecommerce applications, and/or other applications configured accordingly, and thus, can prevent the situations depicted in FIG. 3A and FIG. 3B.

In one or more embodiments, the electronic device is a communication device that further comprises a communication subsystem that communicatively connects the communication device to one or more second devices via an associated network. The processor of the communication device: modifies a call notification setting to silence incoming voice calls as the restrictive setting; and in response to receiving notification from the communication subsystem of an incoming voice call, while the communication device is in the DnD operating mode, records data pertaining to the call in a call log and suspends audio, visual, and haptic notification of the incoming voice call. In one or more embodiments, a use context associated with a do-not-disturb (DnD) operating mode of the electronic device includes a use context associated with at least one of banking transactions and ecommerce transactions.

Figure 4:
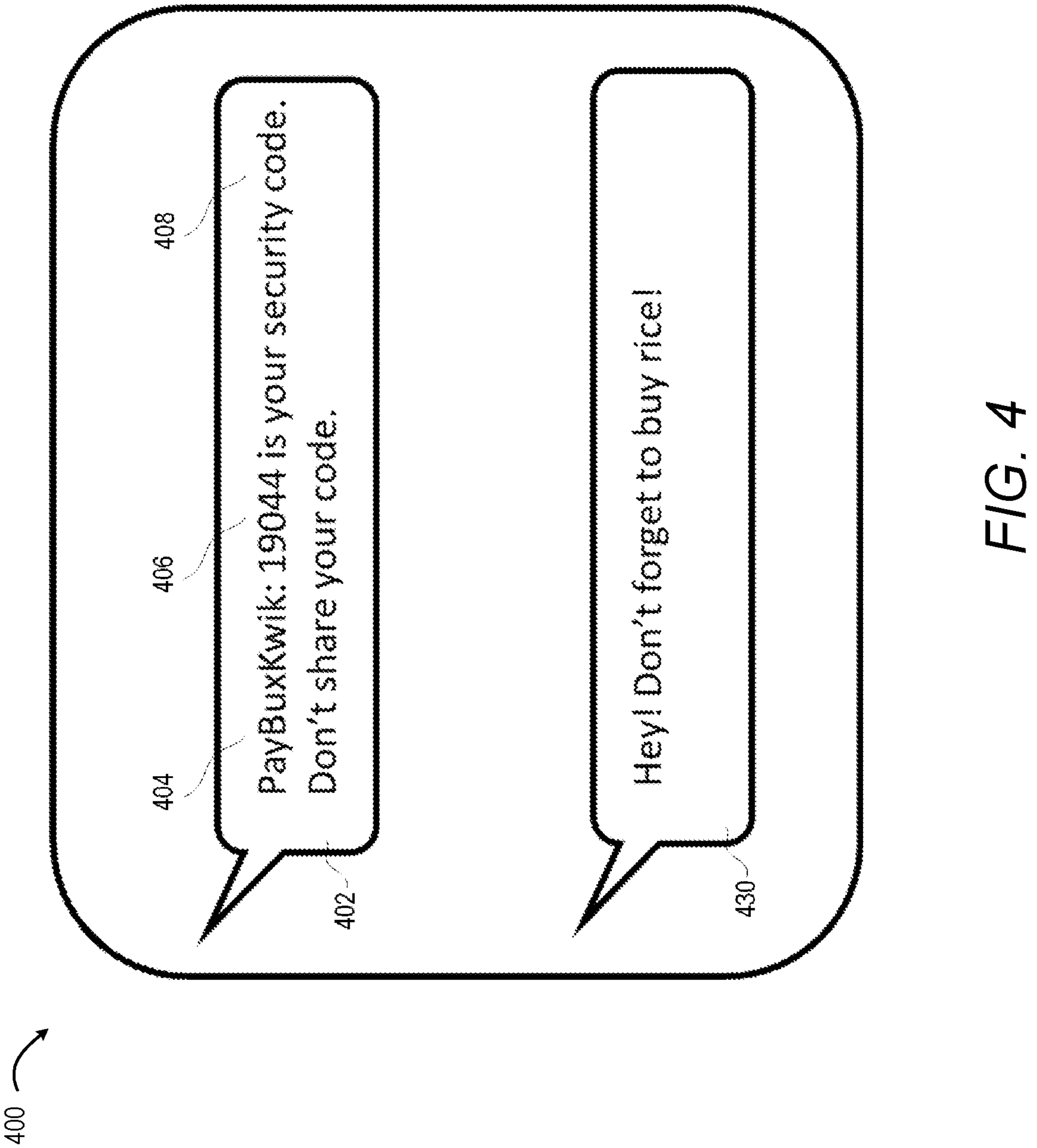
FIG. 4 illustrates exemplary incoming messages that are presented on a display of an electronic device, according to one or more embodiments.

FIG. 4 is a diagram of a device 400 illustrating exemplary incoming messages, according to one or more embodiments. Device 400 can be an implementation of communication device 100 having similar components and/or functionality. The diagram shows a first incoming message 402, and a second incoming message 430. In one or more embodiments, each incoming message is parsed and/or processed to determine if it is a one-time-passcode (OTP). One-time passcodes are commonly used during transactions involving financial operations, such as bank account transfers, ecommerce purchases, and so on. In one or more embodiments, a token analysis process is performed, in which the messages are tokenized, and one or more tokens from the message are inspected to determine if the message is an OTP. As an example, message 402 includes tokens of a sender name 404, a numeric code 406 adjacent to the sender name 404, and also contains the word 'code' at 408 as a token. In embodiments, the processor recognizes this pattern as an OTP, and surfaces the notification, even while the device is operating in a restricted notification mode. In this way, a user can still easily receive notifications that are relied upon to complete a transaction. Conversely, message 430 does not contain a numeric token (e.g., like numeric code 406 in message 402), a sender name associated with authentication (e.g., like sender name 404 in message 402), or any words indicating that message 430 contains a code. Accordingly, while in the restrictive notification mode, message 430 is suppressed, while message 402 is surfaced, thereby enabling critical operations that require OTPs to proceed, while other, unrelated messages, such as message 430, are suppressed during operation in the restrictive notification mode. In one or more embodiments, the processor: determines if a notification contains at least one of a one-time-passcode (OTP) or a message for entry of an OTP to complete a feature of a currently executing application; in response to determining that the notification contains an OTP, surfaces the notification; and in response to determining that the notification does not contain an OTP, silences the notification. Some embodiments may utilize additional and/or alternative techniques for identifying an OTP.

Figure 5:
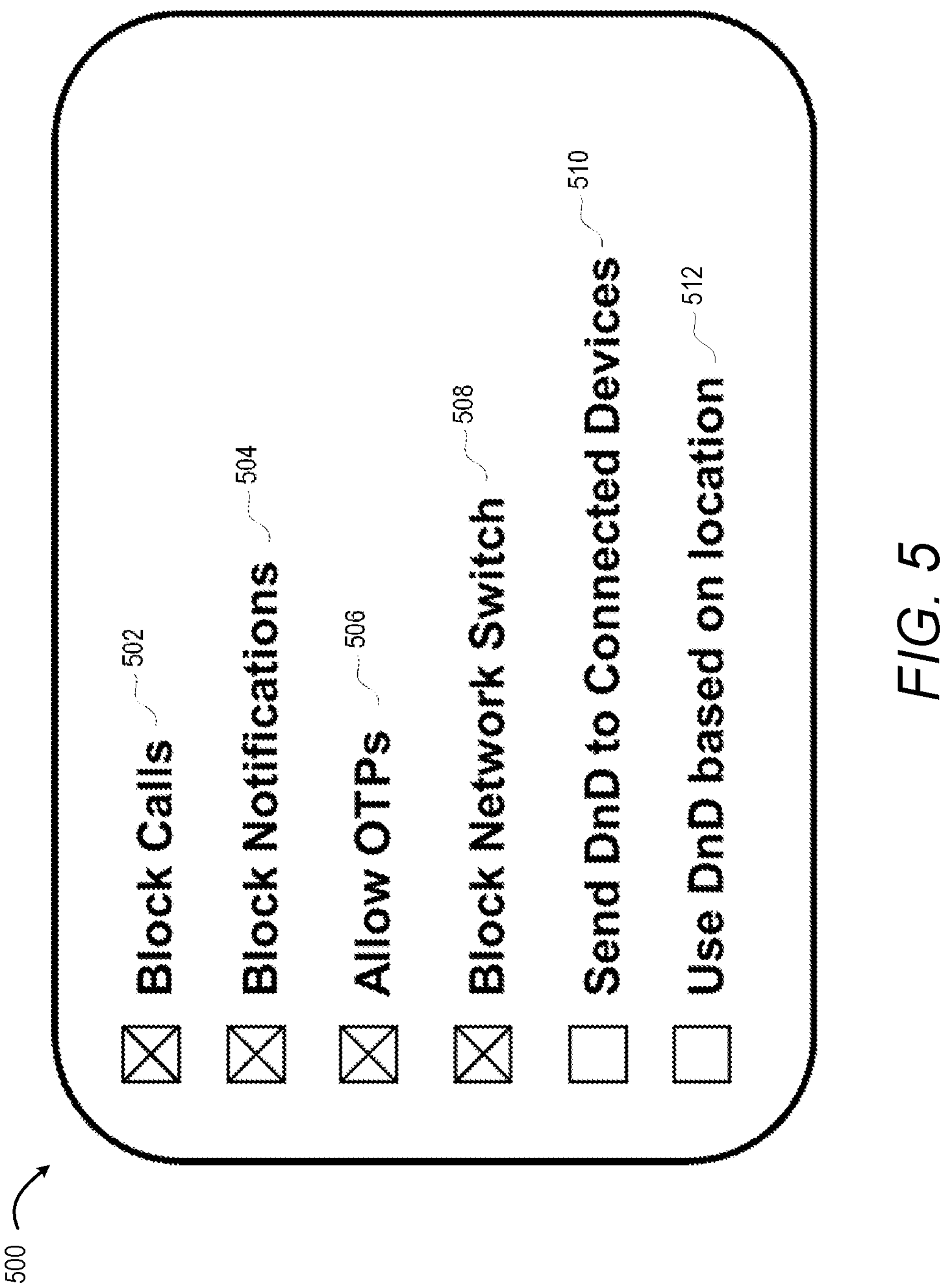
FIG. 5 is an exemplary user interface for configuration of a contextual DnD mode, according to one or more embodiments.

FIG. 5 is an exemplary user interface 500 for configuration of a contextual DnD mode of operation, according to one or more embodiments. User interface 500 includes various actions that an electronic device can take while in restricted notification mode. Option 502, shown as selected in FIG. 5, configures the electronic device to block incoming voice calls while in a restricted notification mode. When option 502 is selected and the electronic device is in a restricted notification mode, voice calls may be directed to voicemail, and/or logged in a call log, while the audio, visual, and/or haptic notification indicating receipt of the call is suppressed. Thus, the scenario depicted in FIG. 3A and FIG. 3B can be prevented when this option is selected.

Option 504, shown as selected in FIG. 5, configures the electronic device to block incoming notifications while in a restricted notification mode. When option 504 is selected and the electronic device is in a restricted notification mode, notifications such as text messages and/or messages from other applications are logged in a message log, but the audio, visual, and/or haptic notification for the incoming message is suppressed. Thus, the scenario depicted in FIG. 2 is prevented when this option is selected.

Option 506, shown as selected in FIG. 5, configures the electronic device to allow one-time passcode (OTP) messages to be surfaced (e.g., presented on a display or via the speakers of the electronic device) while the electronic device is in a restricted notification mode. When option 506 is selected and the electronic device is in a restricted notification mode, messages that match a pattern and/or signature of an OTP, such as depicted in message 402 of FIG. 4, are surfaced, enabling processes such as two-factor authentication (2FA) to proceed, while other notifications are suppressed.

Option 508, shown as selected in FIG. 5, configures the electronic device to block disconnecting of a first wireless network (e.g., WiFi connection or WCN connection) and connecting to a second wireless network while in a restricted notification mode. In one or more embodiments, the electronic device may have a feature where the electronic device automatically connects to a preferred network when the network is available and/or connects to a higher quality network when available. A higher quality network can include one having a higher signal strength, and/or a higher bandwidth than a lower quality network. In many cases, this feature that automatically switches to a higher quality or preferred network is desirable. However, when performing a critical transaction such as a banking transaction or ecommerce transaction, a disruption in network can be detrimental. When option 508 is selected and the electronic device is in a restricted notification mode, the feature of automatically switching wireless networks is temporarily blocked, thereby providing improved network continuity while a user is performing a transaction such as a banking transaction and/or ecommerce transaction.

Option 510, shown as unselected in FIG. 5, configures the electronic device to send a DnD active condition message to connected (or network-accessible) devices while the electronic device is in a restricted notification mode. When option 510 is selected and the electronic device is in a restricted notification mode, the electronic device may periodically (e.g., once per second) send a DnD active condition message to connected devices such as smart televisions, smart speakers, and the like. Accordingly, the remote devices can also implement DnD policies based on the DnD active condition message that is sent from the electronic device, based on a detected use case. As an example, a smart speaker that announces the time of day at the beginning of each hour may mute that announcement if the smart speaker has received a DnD active condition message.

Option 512, shown as unselected in FIG. 5, configures the electronic device to enter a restricted notification mode based on a geographical location. In one or more embodiments, a user may configure one or more DnD locations using a map application, or other application that can accept addresses, and/or geographical coordinates that can be used to designate a geographical location. In some embodiments, the electronic device may include an ultra wideband (UWB) sensor that enables precise location identification within a dwelling. In one or more embodiments, the specified DnD location can be a particular area (e.g., a room of a dwelling) in which a specific user function is performed (e.g., a user's meditation space). The specified DnD location can also be associated with activation of a specific application on the device (e.g., background meditation music) while in the particular area. The configuration for DnD operation based on location can be completed within a user interface generated by the DnD module when a location-specific DnD option 512 is selected.

While the user interface 500 utilizes checkboxes, other embodiments may use a different selection mechanism for configuring a contextual DnD mode of operation. Additionally, some embodiments may have more, fewer, or different user-configurable options than those depicted in user interface 500.

Figure 6:
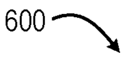
FIG. 6 depicts a flowchart of a method by which an electronic communication device transitions between, and operates in, a contextual DnD mode of operation, according to one or more embodiments.
Figure 6:
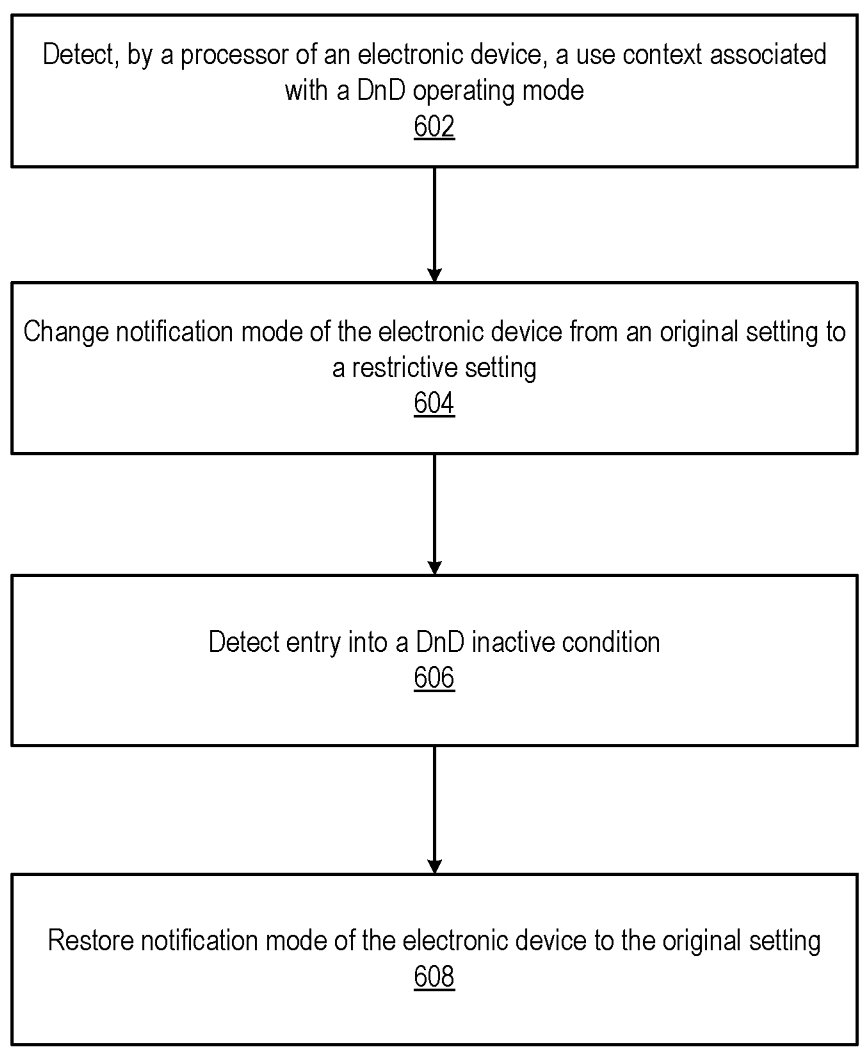
Figure 7:
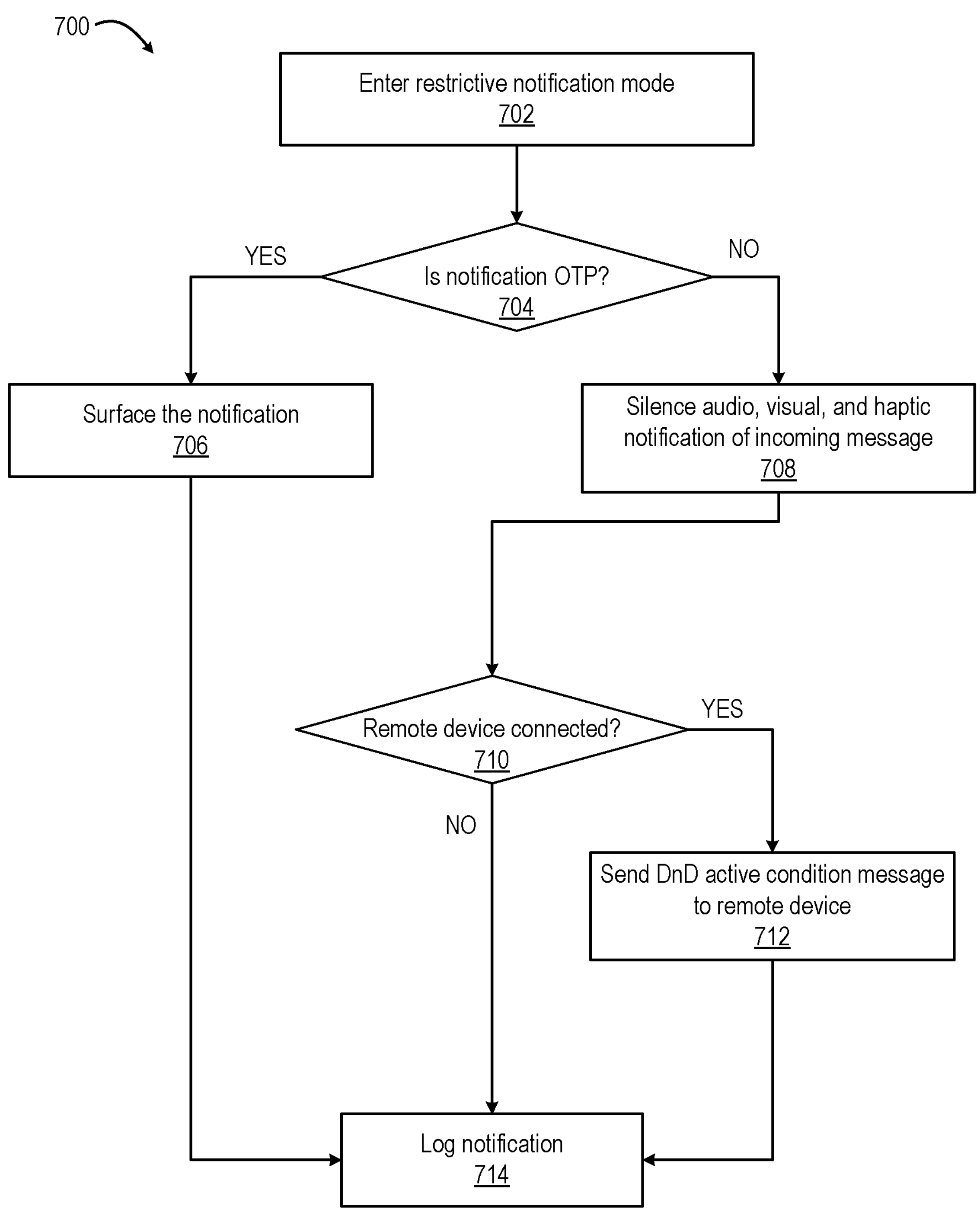
FIG. 7 depicts a flowchart of an additional method by which an electronic communication device processes notifications while in a restrictive notification mode, according to one or more embodiments.
Figure 8:
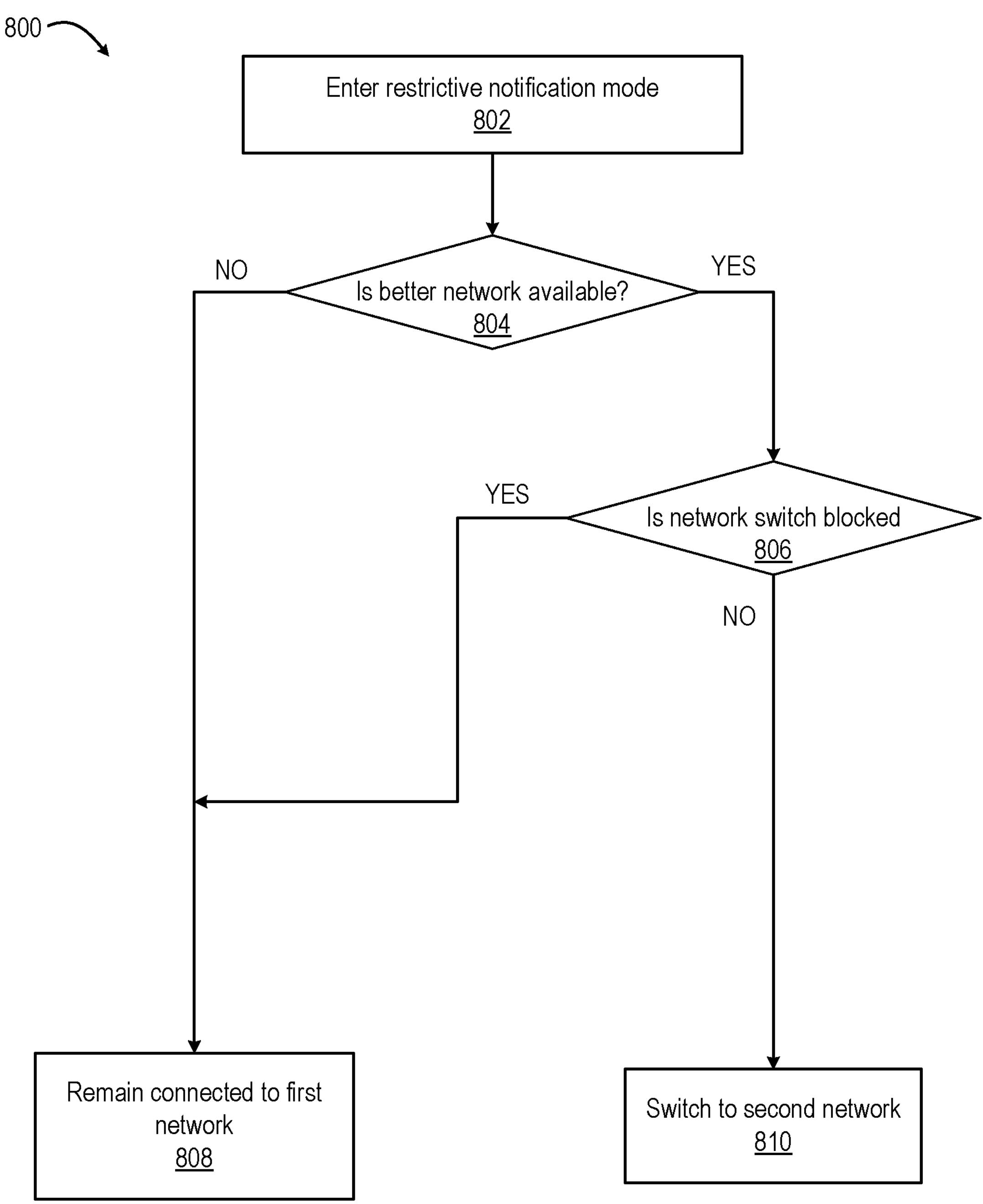
FIG. 8 depicts a flowchart of an additional method by which an electronic communication handles network availability while in a restrictive notification mode, according to one or more embodiments.
Figure 9:
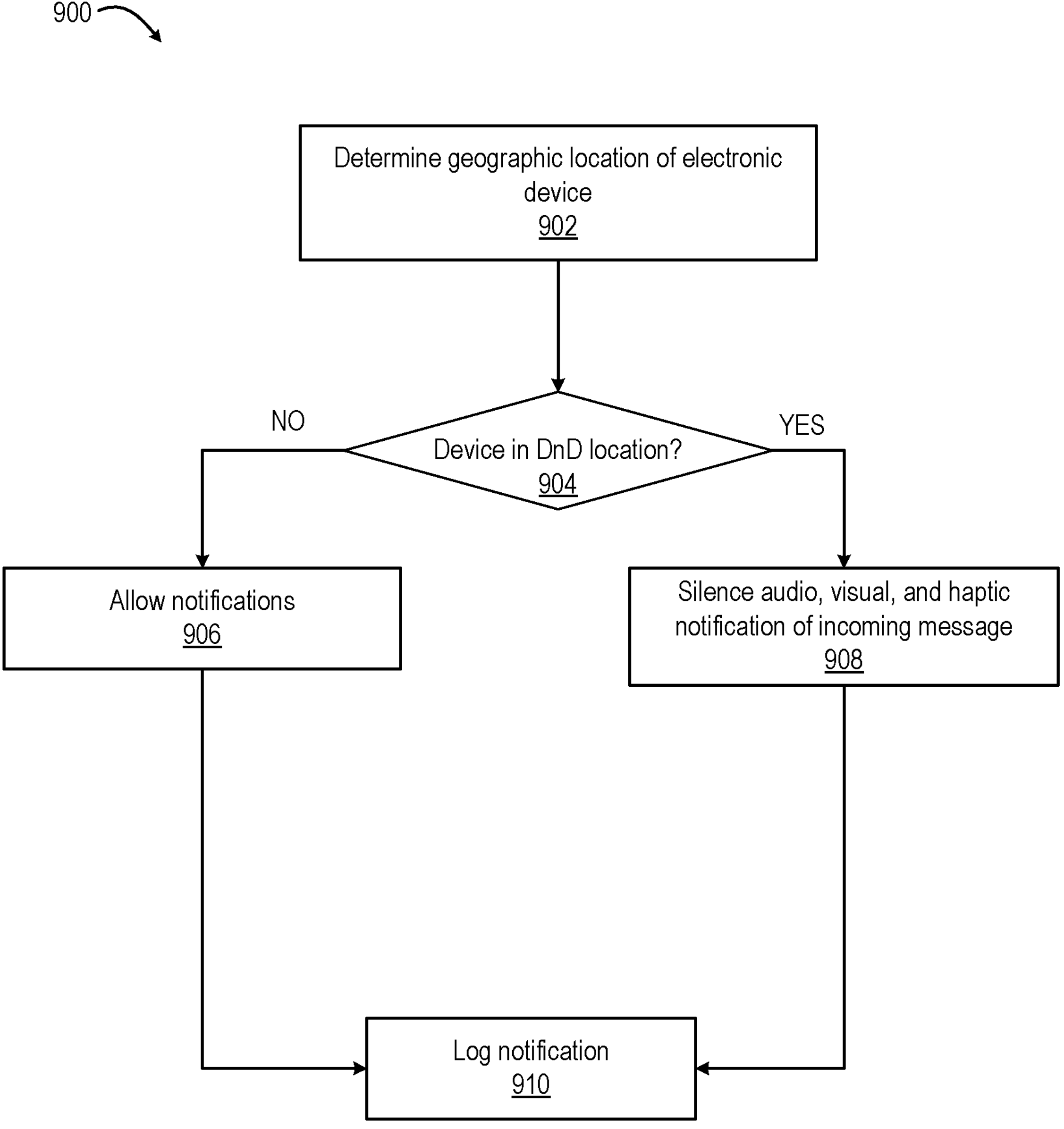
FIG. 9 depicts a flowchart of an additional method by which an electronic communication device transitions into, and operates in, a contextual DnD mode of operation, based on a geographic location associated with the electronic communication device, according to one or more embodiments.

Referring now to the flowcharts, FIG. 6 is a flowchart presenting an embodiment of a method 600 by which a communication device transitions to, and operates in, a restrictive notification mode based on detecting a use context associated with a DnD operating mode. FIG. 7 depicts a flowchart of a method 700 by which an electronic device is configured to operate in, and operates in, a restrictive notification mode, based on a detected use context, according to one or more embodiments. FIG. 8 depicts a flowchart of an additional method 800 by which an electronic communication device blocks network switching based on operating in a restrictive notification mode, according to one or more embodiments. FIG. 9 depicts a flowchart of an additional method 900 by which an electronic communication device transitions to a restricted notification mode based on a determined geographic location of the electronic device, according to one or more embodiments.

The descriptions of the methods in FIGS. 6-9 are provided with general reference to the specific components and features illustrated within the preceding FIGS. 1-5. Specific components referenced in the methods of FIGS. 6-9 may be identical or similar to components of the same name used in describing preceding FIGS. 1-5. In one or more embodiments, processor 102 (FIG. 1) configures electronic/communication device 100 (FIG. 1) to provide the described functionality of the methods of FIGS. 6-9 by executing program code for one or more modules or applications provided within system memory 120 of electronic (communication) device 100.

FIG. 6 depicts a flowchart of a method 600 by which an electronic device processes notifications while in a restrictive notification mode, according to one or more embodiments. At block 602, a processor of an electronic device detects a use context associated with a DnD operating mode. In one or more embodiments, the detection of the 'use context' can include an application executing a system call, API, RPC call, or other suitable technique to indicate to an operating system that the current use context is a do-not-disturb use context. As an example, an application can execute a first API when entering a DnD use context, and execute a second API when exiting the context. In some embodiments, the operating system may determine the use context based on an application (app) executing in the foreground. In some embodiments, the operating system may detect a use context based on network traffic. As an example, detecting network traffic to/from an IP address associated with a financial institution and/or ecommerce site can be a signature used to detect a DnD use context. In one or more embodiments, other criteria, such as the electronic device being in a particular geographical location, can be a condition to detect or determine a DnD use context. In one or more embodiments, sensitive operations such as changing passwords, setting up biometric identification, and/or entering credit card information into a digital wallet, can be conditions to detect or determine a DnD use context. Other criteria may also be used in some embodiments.

At block 604, in response to detecting a use context associated with a DnD operating mode, the processor changes the notification mode of the electronic device from an original setting to a restrictive setting. The original setting may be a 'default' setting and/or a user-specified setting that specifies how incoming notifications and/or incoming calls get processed under a normal (non DnD) use context. The restrictive setting specifies how incoming notifications and/or incoming calls get processed while a DnD use context is in effect, including configuration options shown in FIG. 5 and described accordingly. In one or more embodiments, to change the notification mode of the electronic device from the original setting to the restrictive setting, the processor:

silences/suppresses notifications; and blocks the notifications from appearing on the display of the electronic device.

At block 606, the processor of the electronic device detects entry into a DnD inactive condition. Similar to as previously described, in one or more embodiments, applications may invoke a system call, API, RPC (remote procedure call), or other suitable technique to indicate to an operating system that the current use context is a not a DnD use context. As an example, when a banking application transitions to a 'transaction complete' user interface upon successful completion of a banking transaction, the application or other device code can invoke an API to signify to an operating system executing on the electronic device that the DnD use context is no longer in effect. In some embodiments, the operating system, and/or a monitoring process determines that a particular application is executing in the foreground (e.g., a banking application), and sets the restrictive notification mode based on the foreground application. Similarly, the operating system and/or monitoring process can restore the original notification mode once the given application is no longer executing in the foreground. The method 600 then continues to block 608, where the notification mode of the electronic device is restored to the original setting, allowing incoming calls and/or incoming notifications to be surfaced/handled according to normal operation.

FIG. 7 depicts a flowchart of an additional method 700 by which an electronic device processes notifications while in a restrictive notification mode, according to one or more embodiments. The method 700 begins at block 702 with the electronic device entering a restrictive notification mode, as previously described for block 604 of FIG. 6. At block 704, a check is made to determine if an incoming notification is an OTP. In one or more embodiments, this is accomplished using a token analysis process as previously described in reference to 402 of FIG. 4. It is appreciated that other methods can be utilized to perform this determination. If, at block 704, it is determined that the notification is an OTP, then the method 700 continues to block 706, where the notification is surfaced (e.g., displayed on a display of the electronic device, and/or audibly outputted via a speech-to-text process, or other suitable surfacing of the notification that includes an OTP). If, at block 704, it is determined that the notification is not an OTP, then the method 700 continues to block 708, where the notification is suppressed by silencing audio, visual, and haptic notification of the incoming message. In one or more embodiments, the processor: modifies a message notification setting to silence incoming messages as the restrictive setting; and in response to receiving notification from the communication subsystem of an incoming message, while the communication device is in the DnD operating mode, records data pertaining to the incoming message in a message log, and suspends audio, visual, and haptic notification of the incoming message.

The method 700 then continues to block 710, where a check is made to determine if a remote device is connected. The determination can include checking Bluetooth pairing status for one or more devices, checking for additional devices on a wired or wireless LAN, wireless communication network, and/or other suitable techniques. If, at block 710, it is determined that a remote device is connected, then the method 700 continues to block 712, where the processor of the electronic device sends a DnD active condition message to one or more connected remote device(s) that are on the network. In one or more embodiments, the processor further sends a DnD active condition message to at least one remote device via the communication subsystem.

The method 700 then continues to block 714 where the incoming notification is logged in a message log on the electronic device. If at block 710, it is determined that a remote device is not connected, then the method 700 continues to block 714 where the incoming notification is logged in a message log on the electronic device. Accordingly, a user can later review notifications that arrived while the device was in a restrictive notification mode.

FIG. 8 depicts a flowchart of an additional method 800 by which an electronic device handles network availability while in a restrictive notification mode, according to one or more embodiments. The method 800 begins at block 802 with the electronic device entering a restrictive notification mode, as previously described for block 604 of FIG. 6. At block 804, a check is made to determine if a better wireless network is available. The better wireless network can include a wireless network that has a stronger signal, higher bandwidth, lower cost, and so on. If, at block 804, it is determined that a better wireless network is not available, the flowchart continues to block 808, where the electronic device remains connected to the current (first) network. If, at block 804, it is determined that a better wireless network is available, then the process continues to block 806, where a check is made to determine if network switching is currently blocked, as described pertaining to option 508 of FIG. 5. If, at block 806, it is determined that network switching is currently blocked, then the method 800 continues to block 808, where the electronic device remains connected to the current (first) network. If, at block 806, it is determined that network switching is not currently blocked, then the method 800 continues to block 810, where the electronic device switches to the second (better) network. Thus, in one or more embodiments, the processor, while the electronic device is connected to a first wireless network and operating in the restrictive setting: prevents the communication subsystem from disconnecting from the first wireless network in order to connect to a second wireless network having a higher network quality than the first wireless network; and avoids connecting to the second wireless network, until the DnD inactive condition is detected.

FIG. 9 depicts a flowchart of an additional method 900 by which an electronic device transitions into, and operates in, a contextual DnD mode of operation, based on a geographic location associated with the electronic device, according to one or more embodiments. At block 902, a geographic location of the device is determined. In embodiments, the processor of the electronic device may interface with a GPS module, such as indicated at 160 in FIG. 1. The method 900 then continues to block 904, where a check is made to determine if a user is in a designated DnD location. If, at block 904, it is determined that the device is in a user-configured DnD location, then the method 900 continues to block 908, where incoming notifications and/or voice calls are suppressed by silencing audio, visual, and haptic notifications of the incoming message. The method 900 then continues to block 910, where the notification is logged in a message/call log on the electronic device. If, at block 904, it is determined that the device is not in a user-configured DnD location, then the method 900 continues to block 906, where the notification is allowed to be surfaced/presented on the electronic device. The method 900 then continues to block 910, where the notification is logged in a message/call log on the electronic device. The method 900 depicted in FIG. 9 is useful for specifying certain locations, such as a library, school, hospital, or other suitable location where a user wishes to suppress incoming notifications and/or incoming calls on his/her electronic device. In one or more embodiments, an electronic device comprises a geolocation module communicatively coupled to the processor, where the processor: determines, based on data received from the geolocation module, that a current location of the electronic device is a pre-established location in which DnD operations are completed by a user of the electronic device; and activates the DnD operating mode in response to determining the electronic device is in the pre-established location.

As can now be appreciated, disclosed embodiments provide a convenient feature of suppressing notifications and/or incoming calls or messages based on a detected use context. Accordingly, using (or configuring the device to use) the disclosed embodiments, a user can confidently perform important operations such as financial transactions and the like, while preventing disruption and distraction from incoming calls, texts, and/or notifications. Furthermore, one or more embodiments allow OTP notifications to surface, even in the restrictive notification mode, to allow convenient two-factor authentication to occur, while other notifications not associated with two-factor authentication are suppressed. In this way, disclosed embodiments improve the technical field of electronic devices.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:

at least one output device;

a memory storing instructions for a contextual do-not-disturb module;

a processor communicatively coupled to the display and the memory and that executes the instructions of the contextual do-not-disturb module, which cause the processor to:

detect a use context associated with a do-not-disturb (DnD) operating mode of the electronic device, the use context corresponding to device usage and based on one or more of execution of an application or a subfunction of an application on the electronic device, accessing specific user interfaces within an application or browser, or performing one or more types of operations with the electronic device; and in response to detecting the DnD use context, change a notification mode of the electronic device from an original setting to a restrictive setting.

2. The electronic device of claim 1, wherein the at least one output device comprises a display and an audio output device, and to change the notification mode of the electronic device from the original setting to the restrictive setting, the processor:

silences audible notifications; and blocks the notifications that are visual notifications from appearing on the display of the electronic device.

3. The electronic device of claim 1, wherein:

the electronic device is a communication device that further comprises a communication subsystem that communicatively connects the communication device to one or more second devices via an associated network; and the processor:

modifies a call notification setting to silence incoming voice calls as the restrictive setting; and in response to receiving notification from the communication subsystem of an incoming voice call, while the communication device is in the DnD operating mode, records data pertaining to the call in a call log and suspends audio, visual, and haptic notification of the incoming voice call.

4. The electronic device of claim 3, wherein the processor further sends a DnD active condition message to at least one remote device via the communication subsystem.

5. The electronic device of claim 3, wherein the processor, while the electronic device is connected to a first wireless network and operating in the restrictive setting:

prevents the communication subsystem from disconnecting from the first wireless network in order to connect to a second wireless network having a higher network quality than the first wireless network; and avoids connecting to the second wireless network, until the DnD inactive condition is detected.

6. The electronic device of claim 1, wherein the electronic device is a communication device that further comprises a communication subsystem that communicatively connects the communication device to one or more second devices via an associated network; and the processor:

modifies a message notification setting to silence incoming messages as the restrictive setting; and in response to receiving notification from the communication subsystem of an incoming message, while the communication device is in the DnD operating mode, records data pertaining to the incoming message in a message log, and suspends audio, visual, and haptic notification of the incoming message.

7. The electronic device of claim 1, further comprising a geolocation module communicatively coupled to the processor, and wherein the processor:

determines, based on data received from the geolocation module, that a current location of the electronic device is a pre-established location in which DnD operations are completed by a user of the electronic device; and activates the DnD operating mode in response to determining the electronic device is in the pre-established location.

8. The electronic device of claim 1, wherein while operating the electronic device in the restrictive setting, the processor:

determines if a notification contains at least one of a one-time-passcode (OTP) or a message for entry of an OTP to complete a feature of a currently executing application;

in response to determining that the notification contains an OTP, surfaces the notification; and in response to determining that the notification does not contain an OTP, silences the notification.

9. The electronic device of claim 1, wherein the processor is further configured to:

subsequently detect entry into a DnD inactive condition from among a completion of the DnD use context or a switch to another use context that does not require a DnD operating mode; and restore the notification mode of the electronic device to the original setting, based on detecting the entry into the DnD inactive condition.

10. A method comprising:

detecting, by a processor of an electronic device, a use context associated with a do-not-disturb (DnD) operating mode of the electronic device, the use context corresponding to device usage and based on one or more of execution of an application or a subfunction of an application on the electronic device, accessing specific user interfaces within an application or browser, or performing one or more types of operations with the electronic device; and in response to detecting the DnD use context, changing a notification mode of the electronic device from an original setting to a restrictive setting.

11. The method of claim 10, wherein changing the notification mode of the electronic device from the original setting to the restrictive setting comprises:

silencing notifications; and blocking the notifications from appearing on a display of the electronic device.

12. The method of claim 11, wherein the electronic device is a communication device that further comprises a communication subsystem that communicatively connects the communication device to one or more second devices via an associated network, and the method further comprises:

modifying a call notification setting to silence incoming voice calls as the restrictive setting; and in response to receiving notification from the communication subsystem of an incoming voice call, while the communication device is in the DnD operating mode, recording data pertaining to the call in a call log and suspending audio, visual, and haptic notification of the incoming voice call.

13. The method of claim 12, further comprising sending a DnD active condition message to at least one remote device via the communication subsystem.

14. The method of claim 12, further comprising, while the electronic device is connected to a first wireless network and operating in the restrictive setting:

preventing the communication subsystem from disconnecting from the first wireless network in order to connect to a second wireless network having a higher network quality than the first wireless network; and avoiding connecting to the second wireless network, until the DnD inactive condition is detected.

15. The method of claim 11, wherein the electronic device is a communication device that further comprises a communication subsystem that communicatively connects the communication device to one or more second devices via an associated network, and the method further comprises:

modifying a message notification setting to silence incoming messages as the restrictive setting; and in response to receiving notification from the communication subsystem of an incoming message, while the communication device is in the DnD operating mode, recording data pertaining to the incoming message in a message log, and suspending audio, visual, and haptic notification of the incoming message.

16. The method of claim 11, further comprising:

subsequently detecting entry into a DnD inactive condition from among a completion of the DnD use context or a switch to another use context that does not require a DnD operating mode; and restoring the notification mode of the electronic device to the original setting, based on detecting the entry into the DnD inactive condition.

17. The method of claim 10, further comprising:

determining, based on data received from a geolocation module, that a current location of the electronic device is a pre-established location in which DnD operations are completed by a user of the electronic device; and activating the DnD operating mode in response to determining the electronic device is in the pre-established location.

18. The method of claim 10, wherein operating the electronic device in the restrictive setting comprises:

determining if a notification contains at least one of a one-time-passcode (OTP) or a message for entry of an OTP to complete a feature of a currently executing application;

in response to determining that the notification contains an OTP, surfacing the notification; and in response to determining that the notification does not contain an OTP, silencing the notification.

19. A computer program product comprising a non-transitory computer readable medium having program instructions that when executed by a processor of an electronic device, configure the electronic device to perform functions comprising:

detecting, by the processor, a use context associated with a do-not-disturb (DnD) operating mode of the electronic device, the use context corresponding to device usage and based on one or more of execution of an application or a subfunction of an application on the electronic device, accessing specific user interfaces within an application or browser, or performing one or more types of operations with the electronic device; and in response to detecting the DnD use context, changing a notification mode of the electronic device from an original setting to a restrictive setting.

20. The computer program product of claim 19, wherein the computer program product further comprises program instructions for:

determining if a notification contains at least one of a one-time-passcode (OTP) or a message for entry of an OTP to complete a feature of a currently executing application;

in response to determining that the notification contains an OTP, surfacing the notification; and in response to determining that the notification does not contain an OTP, silencing the notification.

* * * * *